(12) United States Patent
Klingman

(10) Patent No.: US 7,644,411 B1
(45) Date of Patent: *__Jan. 5, 2010__

(54) MECHANISM FOR IMPLEMENTING DIFFERENT TYPES OF SERVICES WITHIN THE SAME TWO-PHASE COMMIT TRANSACTION

(75) Inventor: Vance J. Klingman, St. Anthony, MN (US)

(73) Assignee: Unisys Corporation, Blue Bell, PA (US)

( * ) Notice: Subject to any disclaimer, the term of this patent is extended or adjusted under 35 U.S.C. 154(b) by 622 days.

This patent is subject to a terminal disclaimer.

(21) Appl. No.: 10/165,644

(22) Filed: Jun. 6, 2002

(51) Int. Cl.
*G06F 3/00* (2006.01)
*G06F 15/16* (2006.01)
*G06F 9/44* (2006.01)

(52) U.S. Cl. .................. 719/310; 709/203; 717/100
(58) Field of Classification Search ................. 719/310; 709/203, 229, 223; 717/100
See application file for complete search history.

(56) References Cited

U.S. PATENT DOCUMENTS 5,615,400 A * 3/1997 Cowsar et al. .............. 719/332
5,884,327 A * 3/1999 Cotner et al. ................ 707/202
5,923,879 A * 7/1999 Sasmazel et al. ............ 717/143
6,272,675 B1 * 8/2001 Schrab et al. ................ 717/100
6,415,329 B1 * 7/2002 Gelman et al. .............. 709/245
6,651,073 B1 * 11/2003 Lyle et al. .................... 707/202

OTHER PUBLICATIONS

Baker, Corba Distributed Objects Using Orbix, 1988.*
Werner Froidevaux, The Mainframe as a High-Available, Highly Scalable CORBA Platform, 1999.*

* cited by examiner

*Primary Examiner*—Lechi Truong
(74) *Attorney, Agent, or Firm*—Robert P. Marley; Nawrocki, Rooney & Silvertson, P.A.

(57) ABSTRACT

An apparatus for and method of permitting a CORBA user terminal to request services from an enterprise server having XATMI applications, wherein the process is controlled by an integrated two-phase commit protocol. The service request is generated and transmitted to a server. The user terminal transmits a prepare. When the server acknowledges the prepare, a log entry is made. The user terminal transfers a commit which when acknowledged by the server causes deletion of the log entry. Each of the request/acknowledge communications is performed in both CORBA and XATMI protocols.

6 Claims, 7 Drawing Sheets

MECHANISM FOR IMPLEMENTING DIFFERENT TYPES OF SERVICES WITHIN THE SAME TWO-PHASE COMMIT TRANSACTION

CROSS REFERENCE TO CO-PENDING APPLICATIONS

The present application is related to U.S. patent application Ser. No. 10,164,748, filed Jun. 6, 2002, entitled "MECHANISM FOR CONVERTING CORBA OBJECT REQUESTS TO NATIVE XATMI SERVICE REQUESTS"; U.S. patent application Ser. No. 09/570,701, filed May 15, 2000, entitled "CORBA ACCESS TO SERVICES"; U.S. patent application Ser. No. 09/310,717, filed May 12, 1999, entitled "A GENERIC DCOM SERVER"; U.S. patent application Ser. No. 09/164,932, filed Oct. 1, 1998, entitled "A MULTI-USER CUSTOMIZED DCOM GATEWAY FOR AN OLTP ENTERPRISE SERVER APPLICATION"; U.S. patent application Ser. No. 09/400,647, filed Sep. 21, 1999, entitled "WEBTX MESSAGE QUEUE SYSTEM"; and application Ser. No. 09/164,799, filed Oct. 1, 1998, entitled "A COMMON GATEWAY WHICH ALLOWS APPLETS TO MAKE PROGRAM CALLS TO OLTP APPLICATIONS EXECUTING ON AN ENTERPRISE SERVER"; which are assigned to the assignee of the present invention and incorporated herein by reference.

BACKGROUND OF THE INVENTION

1. Field of the Invention

The present invention relates to methods and apparatus for facilitating on-line processing requests, and more specifically, to a common commit function for CORBA applications accessing existing applications developed using the Extended Application Transaction Module Interface (XATMI) standard.

2. Description of the Prior Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the prospect of using component software technology—the idea of breaking large, complex software applications into a series of pre-built and easily developed, understood, and changed software modules called components—as a means to deliver software solutions much more quickly and at a lower cost (source: DCOM: A Business Overview, online at http://www.microsoft.com/ntserver/guide/dcom.asp). The goal is to achieve economies of scale for software deployment across the industry.

DCOM is a proprietary technology of Microsoft Corporation and is only applicable to Windows based applications. Therefore, there is a need for a much more generalized and universal component architecture to accommodate a wide range of hardware and operating system platforms. Common Object Request Broker Architecture or "CORBA" is indeed such an approach. CORBA was developed through the efforts of a number of interested companies and agencies. An introduction to the approach may be found at http://www.omg.org Thus, CORBA provides a technique for the development of software systems.

This component architecture for building software applications will enable this by: 1) speeding development—enabling programmers to build solutions faster by assembling software from pre-built parts; 2) lowering integration costs—providing a common set of interfaces for software programs from different vendors means less custom work is required to integrate components into complete solutions; 3) improving deployment flexibility—making it easier to customize a software solution for different areas of a company by simply changing some of the components in the overall application; and 4) lowering maintenance costs—isolating software function into discreet components provides a low-cost, efficient mechanism to upgrade a component without having to retrofit the entire application.

A distributed component architecture applies these benefits across a broader scale of multiuser applications. CORBA has several strengths that make it a key technology for achieving this. CORBA works easily with Internet technologies like TCP/IP, the Java language, and the HTTP network protocol, providing "object glue" that will enable business applications to work across the Web. CORBA is also an open technology that runs on multiple platforms.

CORBA has its roots as an alternative to Microsoft's DCOM object technology, which has evolved over the last decade from DDE (Dynamic Data Exchange, a form of messaging between Windows programs), OLE (Object Linking and Embedding, embedding visual links between programs within an application), COM (the Component Object Model, used as the basis for all object binding), and ActiveX (COM enabled for the Internet). In addition to all of the DCOM capabilities, CORBA is applicable to other non-Windows operating systems. As stated earlier, applications built from components are simply easier to debug and evolve than large, monolithic applications.

The logical boundary for component applications is no longer on a single machine. Businesses want to leverage the benefits of component development across a broader set of shared applications that operate on multiple machines. These types of applications are referred to as "three-tier" or "n-tier" applications, where "tiers" of application logic, presentation services, business services, and information retrieval and management services, are broken into different components that can communicate directly with each other across a network. To the end user, these applications appear as a seamless extension of their existing desktop environment.

The simplicity, ubiquity, and industry momentum of standard Internet protocols like HTTP make it an ideal technology for linking components together for applications that span machine boundaries. HTTP is easy to program, is inherently cross-platform, and supports an accessible, universal naming service. Much of the excitement around the Java language derives from its potential as a mechanism to build distributed component applications on the Internet. In addition to Java support, CORBA enables components written in other languages, including C, COBOL, Basic, and Pascal, to communicate over the Internet, providing a growth path for existing applications to support Web technology.

As distributed component architectures, such as CORBA, are making their mark as a technology that enables software components to communicate directly with each other across networks, many businesses have a wealth of information that is managed by prior art data base management systems such as DMS, RDMS, DB2, Oracle, Ingres, Sybase, Informix, and many others. In addition, many of the database management systems are available as resources in a larger transaction processing system.

One key to the future success of a business may lie in its ability to capitalize on the ability to interconnect a distributed component architecture, such as CORBA, with existing enterprise systems having applications developed in accordance with the XATMI standard. It defeats the two main goals of component-based development, fast time-to-market and lower development costs, if companies are forced to "hand code" into their component applications the mission critical services that are required for online production systems. Therefore, the leading system suppliers have developed commercially available "middleware" to link web based work stations with existing XATMI systems.

However, most existing XATMI systems have been developed under the assumption that user work stations are physically, electrically, and functionally dedicated exclusively to providing communication between the XATMI and a single user during an entire user session period. This assumption arose at a time in which user work stations were simply dumb video display/keyboard devices connected directly to the XATMI mainframe via a dedicated electrical line.

Modern work stations, however, are extremely complex and capable of substantial unassisted data processing. Furthermore, the internet connection between a modern work station and the XATMI enterprise system is anything but physically, electrically, and functionally dedicated exclusively to a single user session. A particular problem arises with regard to transactions, such as banking and funds transfer, which require the maximum in reliability. To provide enhanced reliability, both XATMI and CORBA have "commit" facilities. Unfortunately, these facilities tend to be incompatible.

SUMMARY OF THE INVENTION

The present invention overcomes many of the disadvantages associated with the prior art by providing a method and apparatus for accommodating transaction requests from a web based work station directed to an XATMI enterprise server system through utilization of the CORBA technique with a highly integrated double commit facility. In the preferred mode, the work station is an industry compatible personal computer running a commercially available browser operating under a common operating system which may be Windows or other suitable operating system. The client work station is coupled, via the internet, to a CORBA server adapter. The CORBA interface communicates through middleware. This middleware permits the user work station to communicate with the XATMI enterprise server as with other dedicated user terminals.

The CORBA adapter makes the interface to the client terminal appear as the distributed CORBA architecture. The CORBA adapter interfaces with the gateway which causes the CORBA client terminal appear to be a dedicated user terminal to the OLTP enterprise server. The actual connection is made through normal network facilities.

The gateway provides buffering for the transaction permitting the CORBA client terminal to resume normal activity between transmitting the transaction request and the receipt of the service response. The enterprise sever application also does not need be available at the time of a transaction request. Rather than tie up the user work station until a communication time-out occurs, the user work station can perform other tasks, including making additional transaction requests.

The preferred mode of the present invention provides away to direct requests from a CORBA client to XATMI services. Because direct communication is possible, performance is improved as compared to systems that utilize gateway servers. This approach also provides for combining the two-phase commit transaction of the CORBA model with the two-phase commit transaction of the XATMI model into a single two-phase commit transaction.

Two-phase commit protocol is a mechanism to ensure that in the event of a system failure during the processing of a given transaction, all database updates will either be rolled forward so the complete transaction is represented within the database, or will be rolled back and deleted so that none of the transaction is represented in the database. This is necessary so that the database does not become inconsistent from processing only a portion of a given transaction.

A two-phase commit protocol generally involves the client making a service request to at least one server. The server responds with an acknowledgment that the service request has been received. The client then requests that the server "prepare" to commit the transaction changes. This causes the server to store the transaction results within stable, but possibly volatile, storage. The server will respond with an acknowledge when the prepare stage has been completed. Finally, the client requests that the server "commits" the transaction results to non-volatile storage so that these changes will not be lost if a failure occurs. After this commit phase has been accomplished, the server responds with an acknowledgment.

If a failure occurs, system recover actions depend on how far the transaction progressed. For example, if all servers had not yet completed the prepare phase, all changes will be rolled back. If, however, an acknowledgment for the "prepare" phase has been received from all servers, an attempt to roll forward all changes will be performed. If this is not successful, a rollback of all changes will be performed. If all servers had committed the changes, no recovery actions need be taken.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
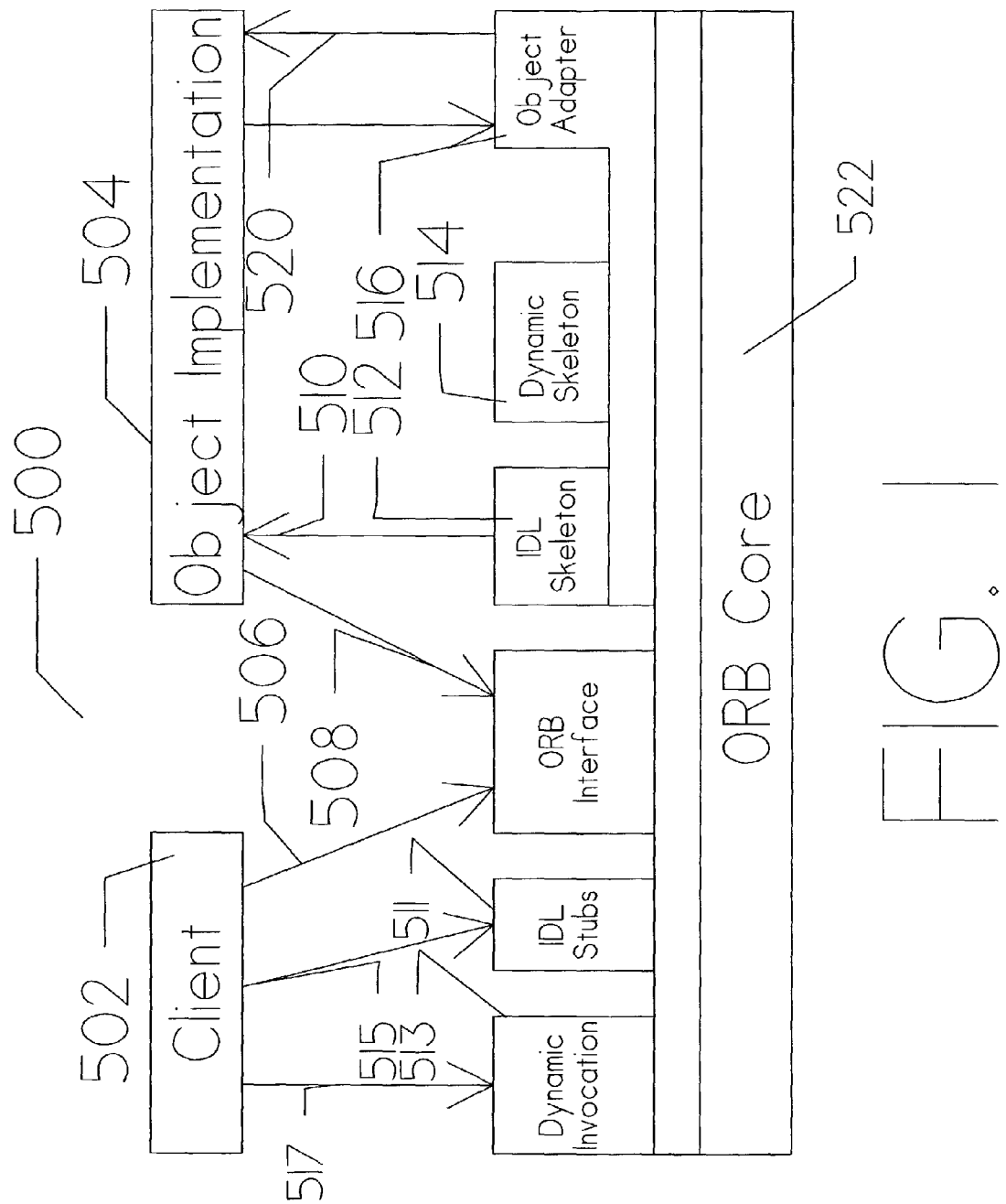
FIG. 1 is a functional block diagram of the Object Request Broker (ORB) of the CORBA computing environment.

FIG. 1 is a functional block diagram of Object Request Broker 500 of the Object Management Group's Common Object Request Broker Architecture (CORBA). The Object Request Broker (ORB) is the central component of the CORBA structure. It contains all of the facilities necessary to identify and locate objects; handle connection management; and deliver data. ORB is responsible for properly transferring all requests.

The basic functionality provided by the ORB consists of passing the request from Client 502 to Object Implementation 504 on which it is invoked. In order to make a request the client can communicate with ORB Core 522 through IDL Stubs 511 or through Dynamic Invocation 513. The stub represents the mapping between the language of implementation of the client and ORB Core 522. Thus the client can be written in any language as long as the implementation of ORB 500 supports this mapping.

ORB Core 522 then transfers the request to Object Implementation 504 which receives the request as an up-call through either IDL Skeleton 512 or Dynamic Skeleton 514. The communication between Object Implementation 504 and ORB Core 522 is effected by Object Adapter 516.

Figure 2:
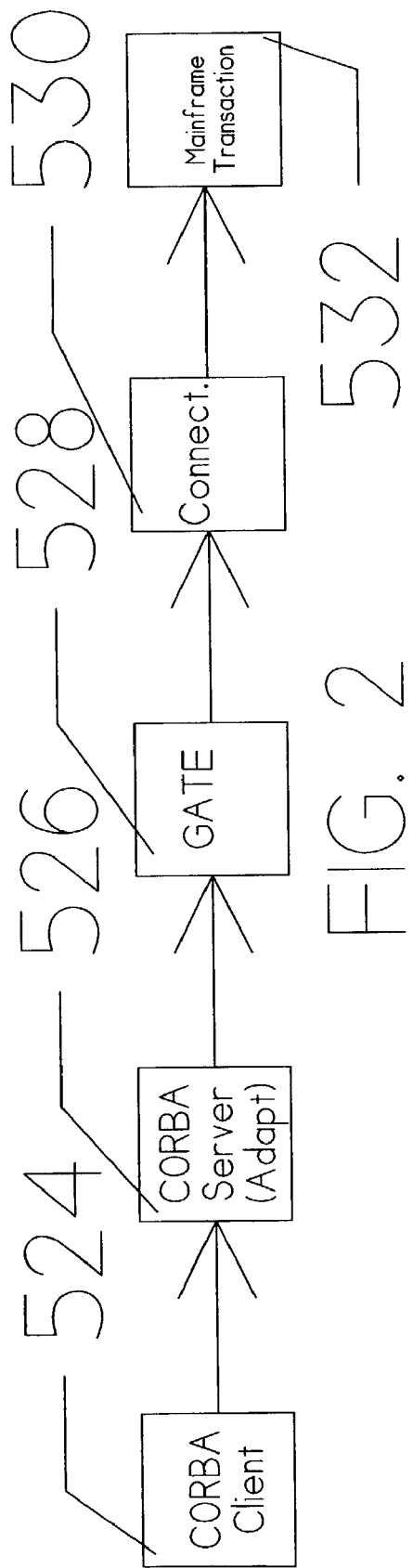
FIG. 2 is a functional block diagram showing the major components of the previous approach.

FIG. 2 is a functional block diagram of the major components of the previous approach to providing CORBA access to XATMI applications. CORBA Client 524 requests a service of the OLTP enterprise server utilizing the CORBA protocol. The request is forwarded to CORBA Server 526 which communicates with CORBA Client 524 in accordance with the CORBA protocol and transfers the request to Gate 528. It is Gate 528 which essentially converts the request from free standing CORBA Client 524 to functionally resemble the dedicated user terminal expected by the OLTP enterprise server.

Gate 528 interfaces with Connector 530 for transmission of the request to Mainframe Transaction 532. Preferably this transfer is in accordance with HTP/ic protocol. Mainframe Transaction 532 processes the request in due course in accordance with its other priorities. The response to the request, if any, is transferred to CORBA Client 524 in the reverse order as available.

Figure 3:
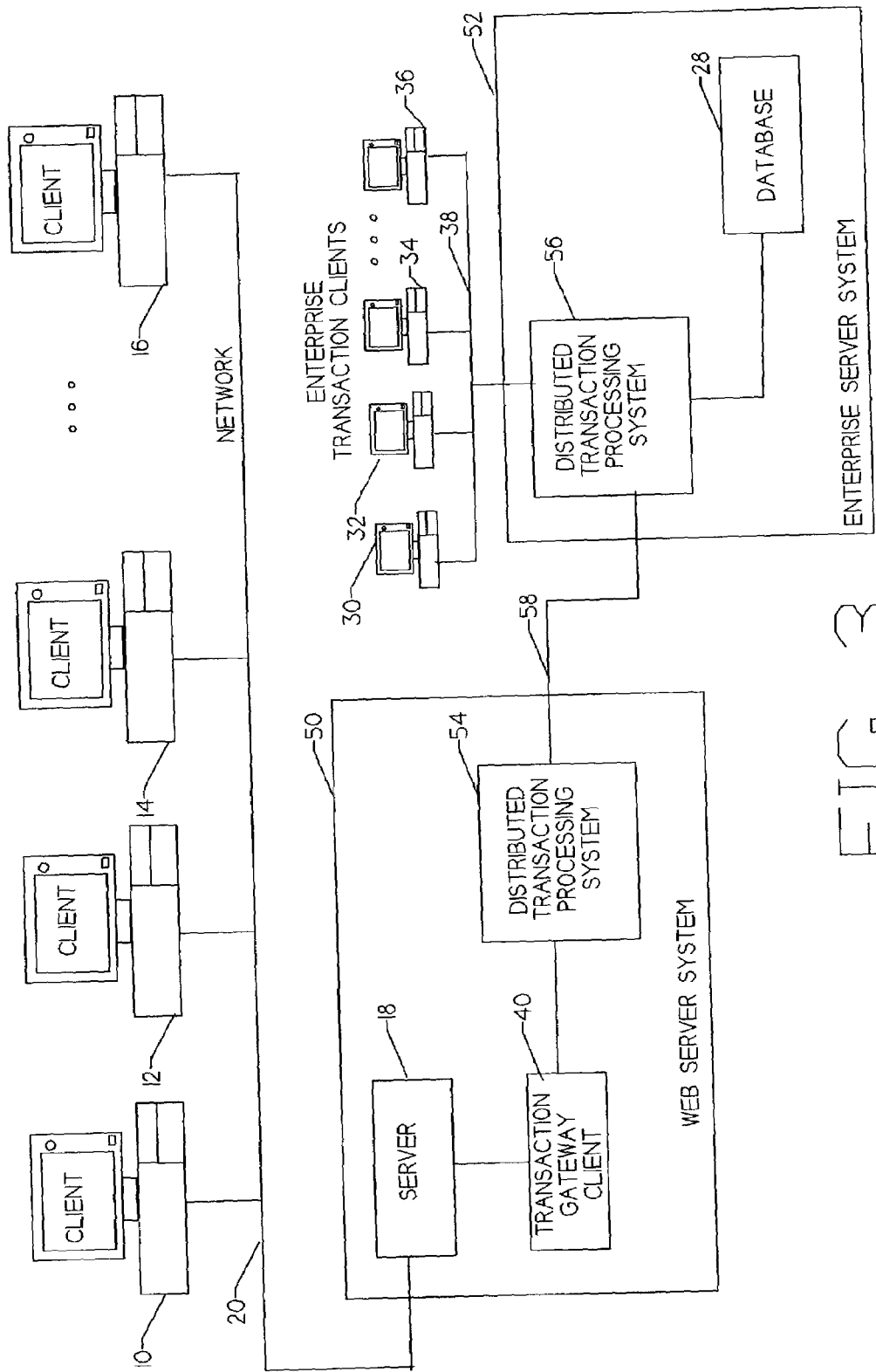
FIG. 3 is a block diagram of a typical hardware/software environment employing the present invention.

FIG. 3 is a functional block diagram of a generalized computing environment in which the present invention could be used to make an enterprise based transaction processing system interoperable with a PC/Workstation based requestor employing the CORBA protocol. A plurality of PC/Workstations, designated as Clients 10, 12, 14, and 16 are coupled to a Server 18 via Network 20. The Network 20 may be an internal local area network or the Internet.

Each of the Clients 10, 12, 14 and 16, is a Personal Computer/Workstation having operating system software and application software designed to provide Graphical User Interface (GUI) and communications capabilities which enable the Client to communicate with an associated Server application 18 via a Network 20. This communication employs the CORBA protocol. Therefore, Clients 10, 12, 14, and 16 may operate under Windows or any number of other suitable operating systems.

The Workstation Server System 50 may be any class of machine(s) which are capable of running a Server application 18 accommodating CORBA along with a Distributed Transaction Processor 54. The Transaction Processing system 54 is designated as Distributed to make clear that a transaction is formatted on the Workstation Server System 50 and forwarded to the Enterprise Server system 52 for processing. The exemplary Enterprise Server System 52 is a 2200 Series data processing system from Unisys and also includes a Distributed Transaction Processing System 56. The Distributed Transaction Processing System 56 is intended to encompass the same functionality as a monolithic transaction processing system, however, it is designated as Distributed to be compatible with the Distributed Transaction Processing System 54. The exemplary Distributed Transaction Processing Systems 54 and 56 are intended to encompass transaction manager software, such as Open/OLTP Transaction Manager software from Unisys, and user implemented Open/OLTP services. The Distributed Transaction Processing System 54 and the Distributed Transaction Processing System 56 are coupled via Network 58. Preferably, the network interface for Network 58 is separate from the network interface for Network 20.

The Distributed Transaction Processing System 56 serves data from the Database 28 to the Transaction Clients 30, 32, 34, and 36. The Transaction Clients 30, 32, 34, and 36 are coupled to the Distributed Transaction Processing System 56 via line 38, of which the underlying technology is driven by the application of the Distributed Transaction Processing System 56.

The Transaction Gateway Client 40 allows the Server 18 to interoperate with the Transaction Processing System. When a Client 10, 12, 14 or 16 selects an enterprise based service, the CORBA request is routed to the Server 18, which in turn routes the request to the Transaction Gateway Client 40. The Transaction Gateway Client 40 determines the requested service and forwards the necessary information to the Distributed Transaction Processing System 54 and 56. The Distributed Transaction Processing System 54 and 56 processes the request against the Database 28 according to the specified request (e.g., select, update, delete). The Distributed Transaction Processing System 54 and 56 returns data and/or status information to the Transaction Gateway Client 40, which in turn formats the data in an appropriate manner for the Server 18. The Server 18 then returns the information to the requesting CORBA Client 10, 12, 14, and 16.

Figure 4:
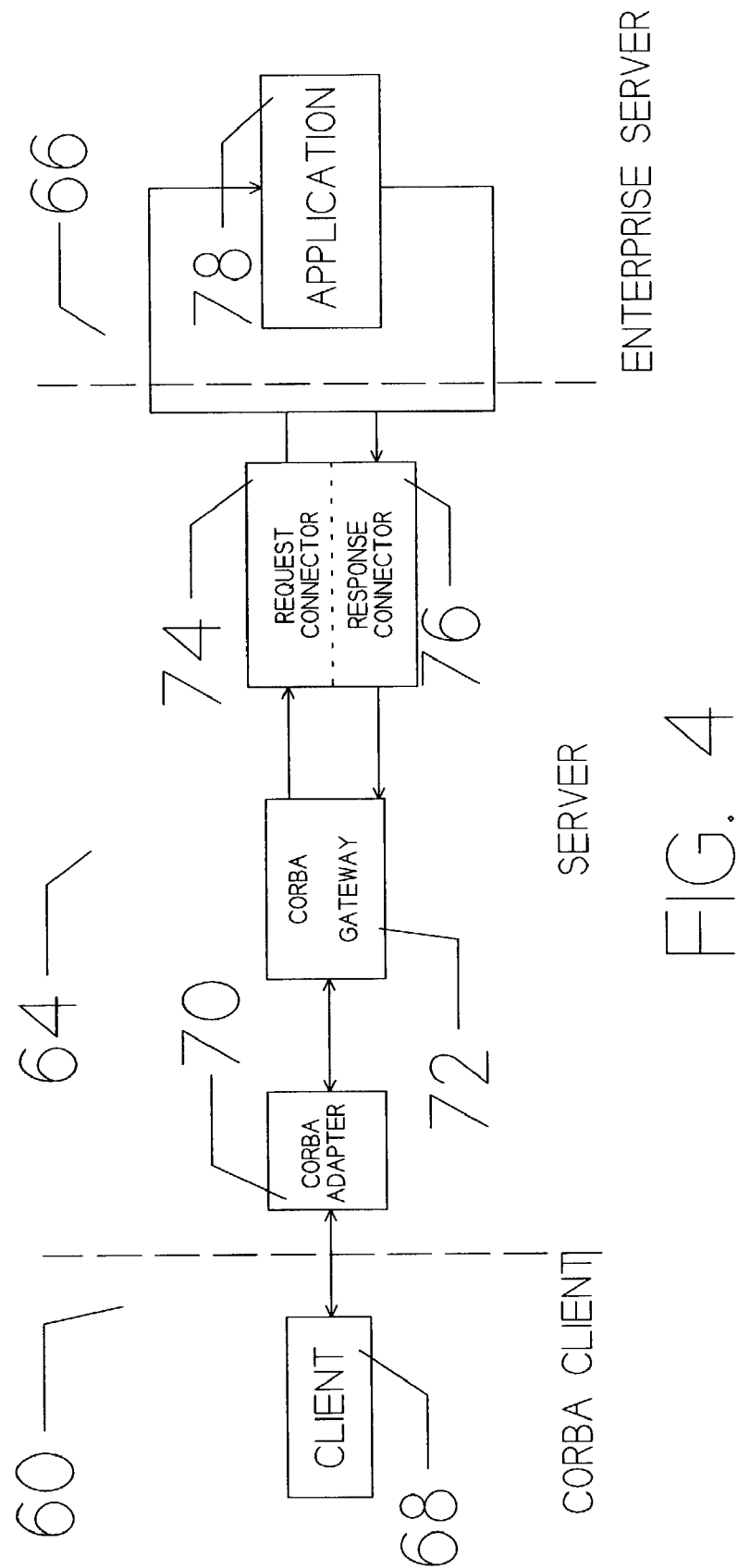
FIG. 4 is a functional block diagram showing data flow of the previous approach.

FIG. 4 is a functional diagram showing data flow through the major components of the previous approach utilizing a CORBA gateway. For explanatory purposes, the system may be divided into three regions. CORBA Client 68 is located within CORBA Client region 60. This represents the user, operating a user terminal, or work station. The user terminal is preferably an industry standard personal computer having a CORBA compatible operating system, which may or may not be Windows based, and a commercially available web browser through which the user communicates with the Server of region 64.

The Server is preferably a CORBA based server having an industry compatible standardized architecture. Hosted on the Server is CORBA Adapter 70. The nature of CORBA Adapter 70 is discussed in greater detail below. However, it permits standardized CORBA based communication from CORBA Client region 60 to couple to existing enterprise server applications.

Necessary to the practice of this approach is CORBA Gateway 72, which provides the logic for formatting and transferring requests from and responses to the CORBA environment. Through this gateway operating with CORBA Adapter 70, the CORBA client can request and receive messages which utilize any CORBA supported format including html, java, c-client, vb-client, etc. The data transfers at this point are in standard view format.

Request Connector path 74 actually transfers the request messages to be made available to Application 78. Application 78 of the enterprise server located in Enterprise Server region 66, transfers response messages to Response Connector path 76 for transmission to Client 68. CORBA Gateway 72 manages the data flow through the single connector consisting of Request Connector path 74 and Response Connector path 76.

When client 68 makes a request, it is transferred using CORBA protocol to CORBA Adapter 70 and transferred for servicing to Application 78 via Request Connector path 74. The response, if any, is transferred from Application 78 via Response Connector 76 path to CORBA Gateway 72. The response is converted to CORBA format and transferred to Client 68 in CORBA protocol by CORBA adapter 70.

Figure 5:
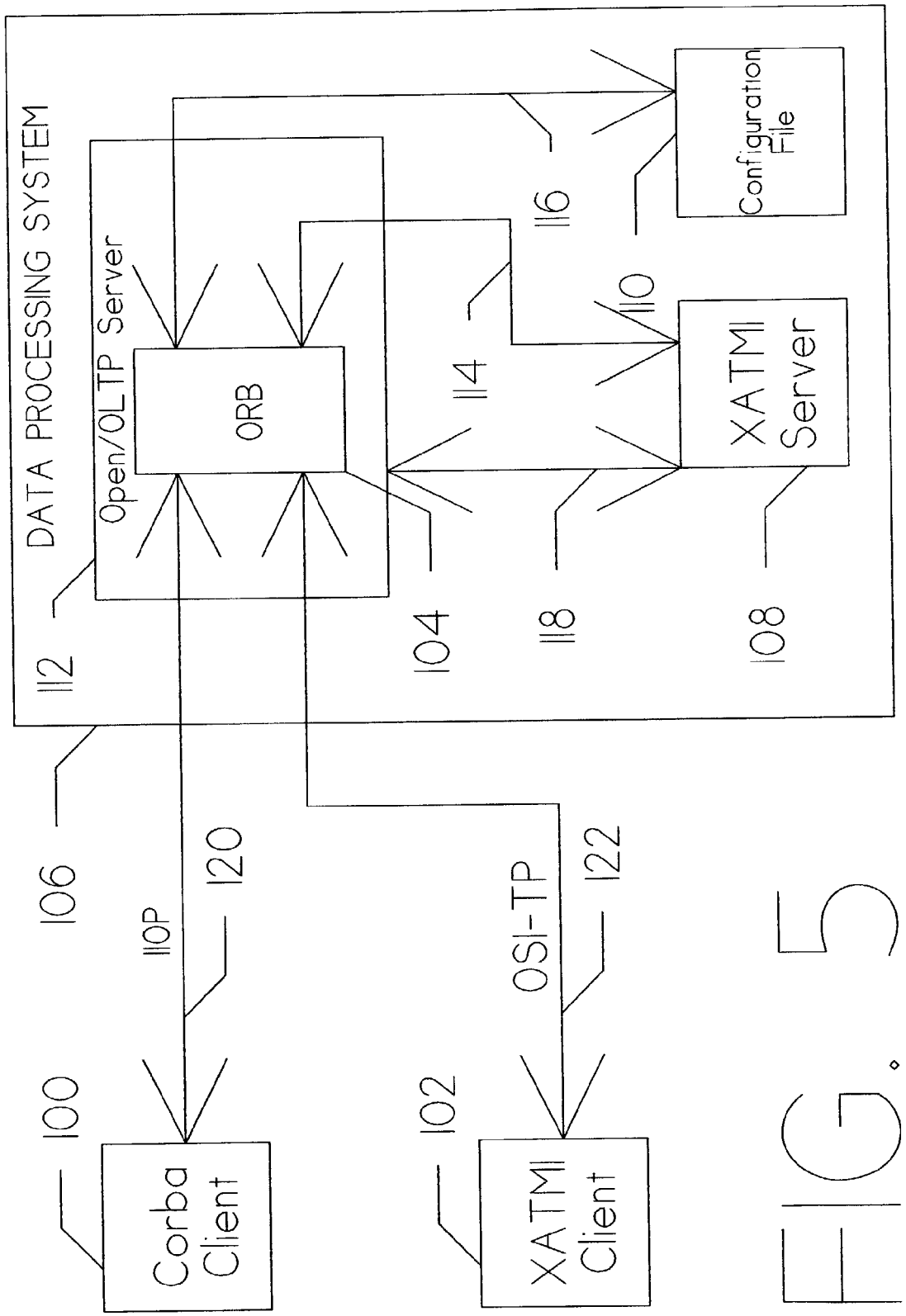
FIG. 5 is a diagram showing the relationship of the key run time software components of the present invention.

FIG. 5 is a system block diagram showing the preferred mode of the present invention. Open/OLTP 112 resides within a data processing system 106, such as a Model 2200 system commercially available from Unisys Corporation. XATMI client 102 calls services within Open/OLTP 112 using standard OSI-TP communication protocol via path 122. These requests are forwarded for processing by XATMI server 108 via path 118. These requests do not require any conversion because they are already in the format used by the XATMI services.

In contrast to XATMI client 102, CORBA client 100 makes requests in Internet Inter-Orb Protocol (IIOP) using an IIOP communications protocol. These requests cannot be forwarded directly to XATMI 108 for processing because they are not in the correct format. As explained above, these requests may be intercepted by a CORBA server that reformats the requests into OSI-TP communications protocol to resemble requests from XATMI client 102. However, processing requests in this manner tends to degrade performance.

In accordance within the preferred mode, these requests are forwarded via path 120 directly to CORBA Object Request Broker (ORB) 104 within Open/OLTP server 112. ORB 104 reformats the requests dynamically as the requests are passed to XATMI server 108 via path 114 such that little performance impact is associated with this translation.

Figure 6A:
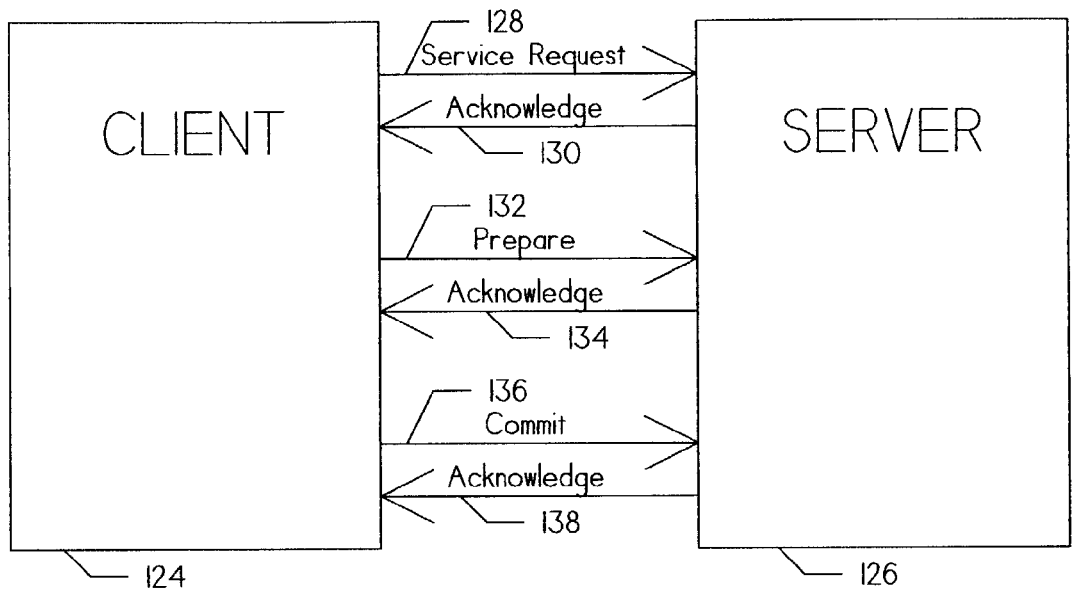
FIG. 6A is a detailed diagram showing the basic "handshake" protocol.

FIG. 6A is a detailed diagram showing the two-phase commit protocol of the present invention. As can be readily seen, this protocol entails three pairs of "request/acknowledge" communications. Each of these requests and acknowledgments is performed for each of the servers involved in the transaction as if two separate transactions were occurring. However, after the acknowledgment for the prepare phase is received for each of the servers, the client generates a single log record in memory that includes status for both of the transactions. This, in essence, creates a single transaction out of the two separate transactions.

To initiate the protocol, client 124 transfers service request 128 to server 126. Server 126 acknowledges receipt of service request 128 via acknowledge 130. Client 124 sends "prepare" 132 to notify server 126 to prepare to honor service request 128. Acknowledge 134 indicates satisfactory receipt of prepare 132. Client 124 sends commit 136 to initiate completion of the commit cycle at server 126. Server 126 indicates commit via acknowledge 138.

Figure 6B:
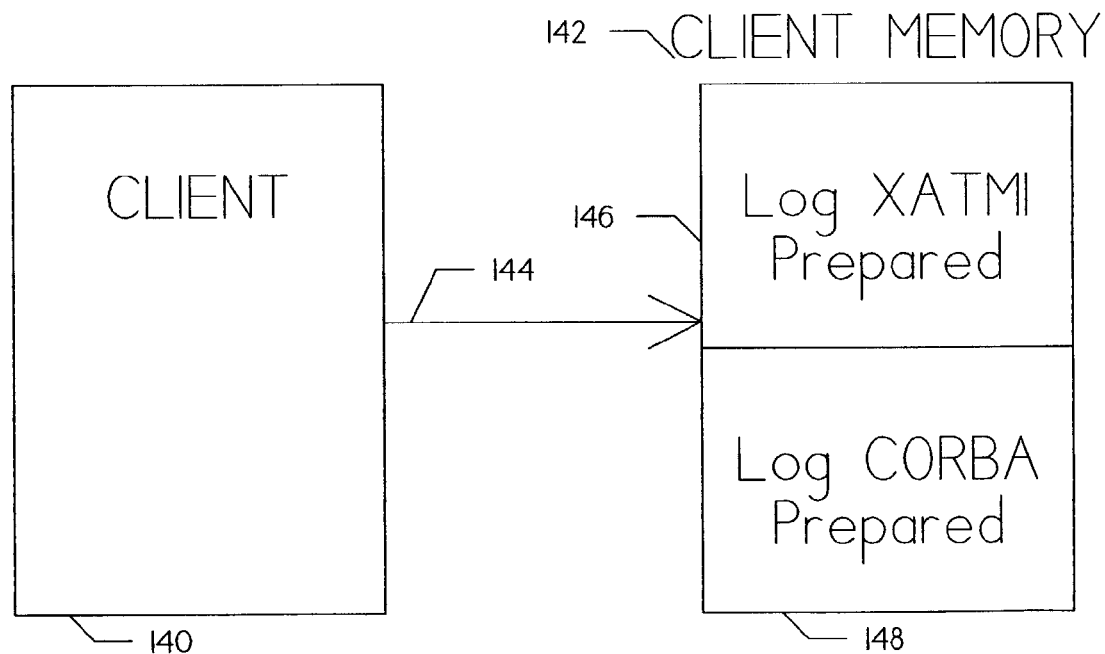
FIG. 6B is a detailed diagram showing the internal client operation.

FIG. 6B is a detailed diagram showing the internal operation of the client during the integrated two-phase commit protocol of the present invention. As explained above, after receipt of acknowledge 134 (see also FIG. 6A), client 140 makes a single log entry into its memory 142 indicating the status of the process. Prior to making of this log entry, any interrupted transaction is rolled back. After this entry, the system will attempt to roll forward any interrupted transaction. The single log entry involves indication at XATMI log 146 of the XATMI prepare acknowledgment and indication at CORBA log 148 of the receipt of the CORBA acknowledgment (see also FIG. 6A).

Figure 7:
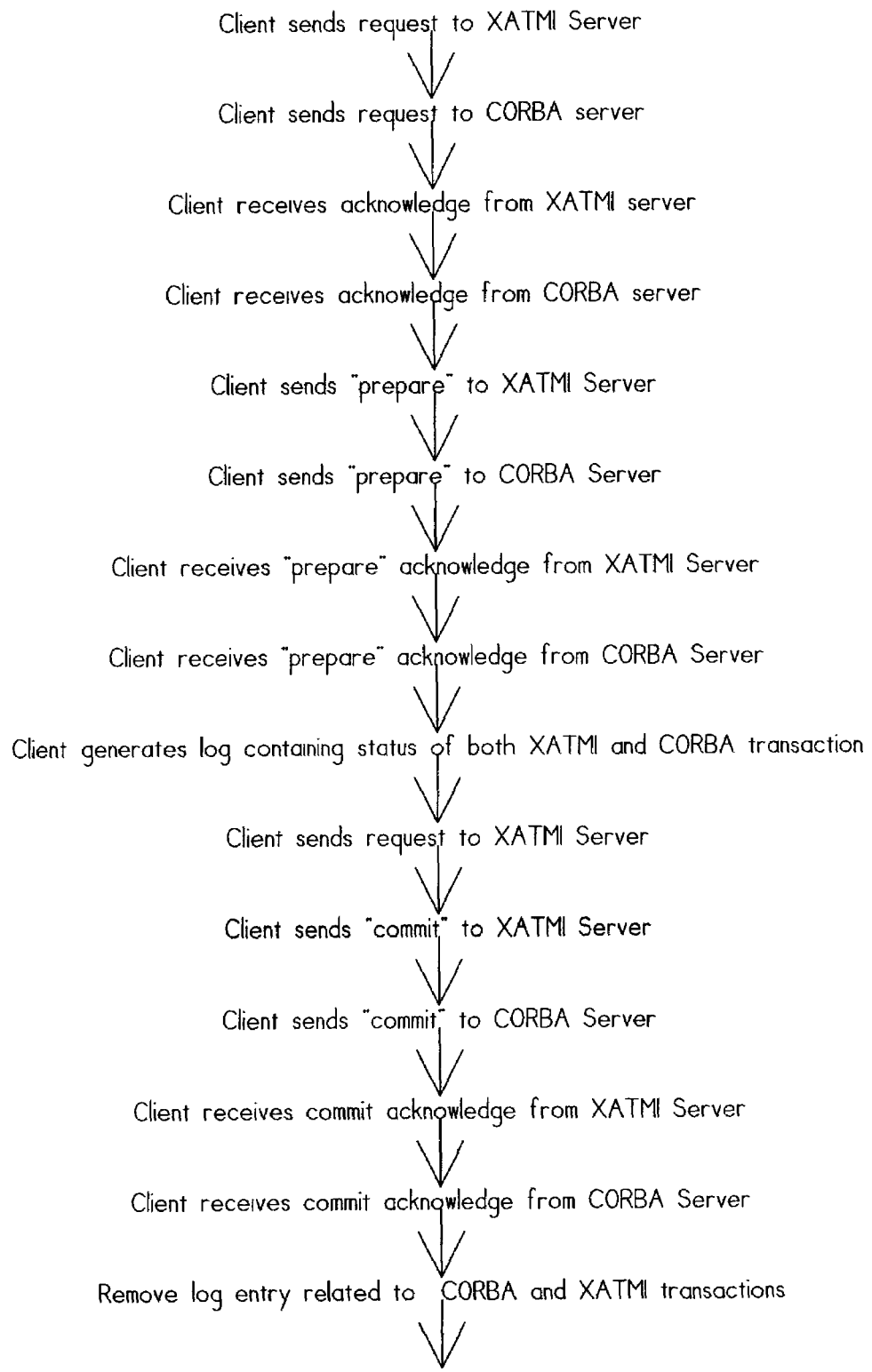
FIG. 7 is a detailed diagram illustrating the complete sequence of commit steps.

FIG. 7 is a detailed ordered list of the operations involved in the process of the present invention. The first two steps correspond to service request 128 (see also FIG. 6A). Acknowledge 130 corresponds to steps three and four. Steps five and six are accomplished as prepare 132, and steps seven and eight accomplish acknowledge 134. As explained above, log entry 144 is next made at step nine, which separates roll back from possible roll forward recovery from transaction interruption.

Steps 10 and 11 correspond to the sending of commit 136. Acknowledge 138 corresponds to steps 12 and 13. Upon receipt of both commits (i.e., acknowledge 138), client 140 deletes the log entry made at step nine (see also FIG. 6B), thereby completing the protocol.

Having thus described the preferred embodiments of the present invention, those of skill in the art will readily appreciate that the teachings found herein may be applied to yet other embodiments within the scope of the claims hereto attached.

We claim:

1. A data processing system comprising:
   a client computer;
   a memory;
   a. a database;

b. a user terminal of the client computer for entering a transaction request in CORBA protocol;

c. an enterprise CORBA server for receiving said transaction request from said user terminal by using the CORBA protocol via the publicly available digital communication network and for communicating with an XATMI (extended application transaction module interface) server via a non-CORBA protocol for responding to said transaction request responsively coupled via the publicly available digital communication network to said user terminal; and wherein said user terminal is responsively coupled to said XATMI (extended application transaction module interface) server and said CORBA server via the publicly accessible digital data communication network wherein the non-CORBA protocol is an XATMI;

d. a two-phase commit facility to ensure that if a failure of said enterprise CORBA server occurs during processing of said transaction request, any updates to said database will either be rolled forward so that said transaction request is completed and is represented within said database, or will be rolled back and deleted so that none of said transaction request is represented in said database, responsively coupled to said user terminal and said enterprise CORBA server for controlling complete honoring of said transaction request;

wherein said user terminal comprises a log within said memory such that said user terminal records process regarding said complete honoring of said transaction request and; wherein said log further comprises a CORBA portion associated with the enterprise CORBA server and an XATMI (extended application transaction module interface) portion associated with the XATMI server.

2. The data processing system according to claim 1 wherein said user terminal further comprises a memory and said log is located within said memory.

3. The data processing system according to claim 2 wherein said publicly accessible digital data communication network further comprise an Internet.

4. An apparatus comprising:
a client computer;
a memory;

a. A user terminal of the client computer for generating a service request using a first protocol wherein said first protocol further comprises CORBA;

b. A publicly accessible digital data communication network responsively coupled to said user terminal;

c. a enterprise CORBA server for receiving said service request from said the user terminal by using the CORBA protocol via the publicly available digital communication network and for communicating with an XATMI (extended application transaction module interface) server via a second protocol responding to said service request responsively coupled via a publicly available digital communication network to said user terminal; and wherein said user terminal is responsively coupled to said XATMI (extended application transaction module interface) server and said CORBA server via the publicly accessible digital data communication network, wherein said second protocol further comprises XATMI (extended application module transaction interface); and d. A two-phase commit protocol for controlling honoring of said service request by ensuring that if a failure of said CORBA server occurs during, processing of said service request, any updates to said database will either be rolled forward so that honoring of said service request is completed and represented within said database, or will be rolled back and deleted so that none of said service request is represented in said database;

wherein said user terminal comprises a log within said memory such that said user terminal records process regarding said complete honoring of said transaction request and; wherein said log further comprises a CORBA portion associated with the enterprise CORBA server and an XATMI (extended application transaction module interface) portion associated with the XATMI server.

5. A computer implemented method of controlling a complete honoring of a transaction service request comprising:

a. Entering on the computer from a user terminal a transaction request in CORBA protocol, b. Transmitting said transaction request from said user terminal to an enterprise CORBA server using the CORBA protocol via a publicly available digital communication network;

communicating from the CORBA server to an XATMI (extended application transaction module interface) server via a second protocol for responding to said transaction request responsively coupled via the publicly available digital communication network to said user terminal;

wherein said user terminal is responsively coupled to said XATMI (extended application transaction module interface) server and said CORBA server via a publicly accessible digital data communication network, wherein said second protocol further comprises XATMI (extended application module transaction interface); and c. Ensuring via a two-phase commit facility that if a failure of said enterprise server occurs during processing of said transaction request, any updates to said database will either be rolled forward so that transaction request is completed and is represented within said database, or will be rolled back and deleted so that none of said transaction request is represented in said database, responsively coupled to said user terminal and said enterprise server for controlling complete honoring of said transaction request;

wherein said user terminal comprises a log such that said user terminal records process regarding said complete honoring of said transaction request and; wherein said log further comprises a CORBA portion associated with the enterprise CORBA server and an XATMI (extended application transaction module interface) portion associate with the XATMI server.

6. The computer implemented method according to claim 5, wherein said publicly accessible digital data communication network further comprises an Internet.

* * * * *